(12) United States Patent
Blanco

(10) Patent No.: US 7,948,640 B2
(45) Date of Patent: May 24, 2011

(54) METHOD AND DEVICE FOR LOCATING A PIECE WITH RESPECT TO A TOOL

(75) Inventor: Mario Blanco, Turin (IT)

(73) Assignee: Ficep S.p.A., Gazzada Schianno (IT)

(*) Notice: Subject to any disclaimer, the term of this patent is extended or adjusted under 35 U.S.C. 154(b) by 34 days.

(21) Appl. No.: 12/316,110

(22) Filed: Dec. 9, 2008

(65) Prior Publication Data

US 2010/0007871 A1    Jan. 14, 2010

(30) Foreign Application Priority Data

Jul. 10, 2008    (IT) .............................. MI2008A1252

(51) Int. Cl.
*G01B 11/14*    (2006.01)

(52) U.S. Cl. ....................................... 356/614; 356/622

(58) Field of Classification Search .......... 356/614–623; 347/19; 250/559.22, 559.24
See application file for complete search history.

(56) References Cited

U.S. PATENT DOCUMENTS

| | | | | |
|---|---|---|---|---|
| 4,888,490 | A * | 12/1989 | Bass et al. ................. | 250/559.16 |
| 6,094,262 | A * | 7/2000 | Almeida et al. .............. | 356/130 |
| 2004/0246290 | A1 * | 12/2004 | Hayashi et al. ................. | 347/19 |
| 2007/0076225 | A1 * | 4/2007 | Nakata et al. ................. | 356/616 |
| 2008/0008513 | A1 * | 1/2008 | Kakishima et al. ........... | 400/579 |
| 2009/0212481 | A1 * | 8/2009 | Takayama .................. | 271/10.11 |

* cited by examiner

*Primary Examiner* — Hoa Q Pham
(74) *Attorney, Agent, or Firm* — Kirschstein, et al.

(57) ABSTRACT

A method of, and a device for, locating a piece with respect to a tool, utilize a measuring device for measuring a feeding speed, a driving direction and a feeding amount of the piece. The piece bears against two abutment rollers and is driven by a driving roller that is operated by a controllable motor operatively coupled to a machine numerical control apparatus. An output of the measuring device and an output of the controllable motor are both coupled to the machine numerical control apparatus.

9 Claims, 1 Drawing Sheet

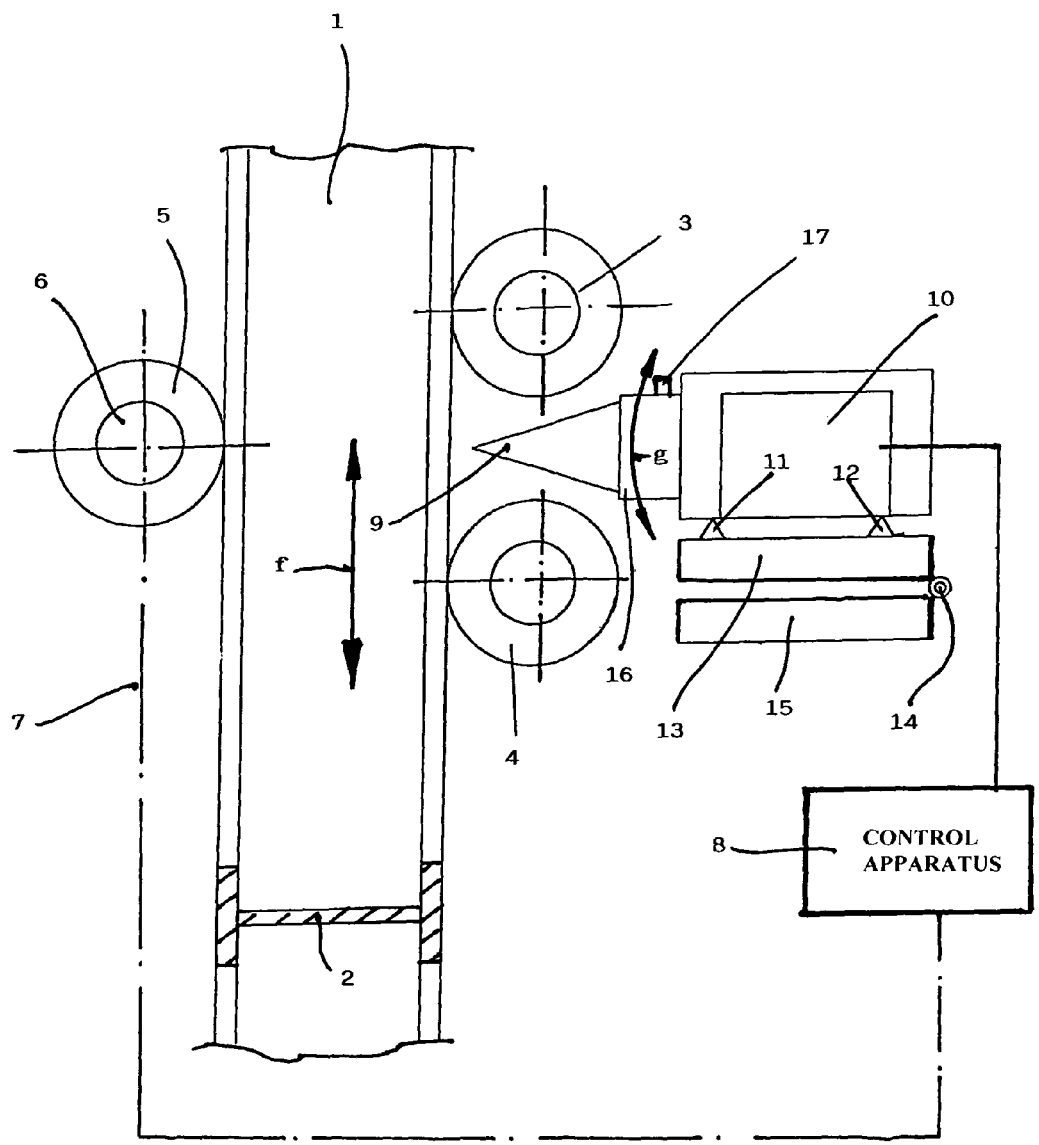

METHOD AND DEVICE FOR LOCATING A PIECE WITH RESPECT TO A TOOL

BACKGROUND OF THE INVENTION

The present invention relates to a method and a device for locating a workpiece with respect to a tool.

As is already known, for processing metal section members or sheet metal and plate elements of any desired thickness and size, numerical control apparatus are conventionally used both for locating and for properly machining the workpiece, by drilling, milling, punching, cutting and other machining operations performed by disc or strip plates, or by thermal workpiece processing sources.

In particular, for carrying out the above mentioned machining operations, a prior machining method provides to grip the section member by one or more grippers supported by a gripper carriage sliding on sliding guides and controllably driven by a servomotor and geared unit assembly.

In this method, data related to the position, speed and driving direction of the workpiece are derived from an encoder or a resolver which are operatively coupled to the section member driving carriage.

Thus, this method provides parameters related to the carriage being operatively driven, but not to the actual position of the workpiece being machined with respect to its machining tools.

Thus, while the above mentioned prior system provides a comparatively high machining precision, it has the drawback of a comparatively large size and length, since the carriage driving means have a length at least corresponding to the workpiece length.

In addition to the above drawback, one must also consider the length of the workpiece and grippers and gripper control means, which length at least corresponds to that of the workpiece processing units.

In yet another prior workpiece processing system the workpieces are driven by driving rollers at least one of which is driven by a motor causing in turn a workpiece to be driven. While this latter prior system has a size less than that of the gripper carriage system, it, however, has a poor processing precision, in particular as the workpieces being machined have a large length.

Such a poor machining precision being due to the arrangement of encoder of resolver devices on the rotary axis of the driving roller or of the measuring roller.

In fact, both the above prior systems must necessarily transform a rotary movement to a linear movement by using, for this transforming operation, the value 3, 14 . . . corresponding to π which, as is known, is not an entire number and, accordingly, in a rotary assembly, generates a workpiece positional error.

A further drawback of the above latter system is that the driving and measuring rollers are subjected to a comparatively high wear undesirably changing the roller circumferences, thereby the workpiece cannot be precisely located with respect to its machining tool, since the roller wear, usually generated by small section member workpiece, is uneven on the overall roller circumference and height of the rollers.

Finally, it should be also added to the above that said rollers frequently have, to provide a sure gripping of the roller and section members, a knurled texture, thereby said rollers operate on variable diameters, which change depending on the variable pressure pressing said rollers against the section member being machined.

SUMMARY OF THE INVENTION

Accordingly, the aim of the present invention is to overcome the above mentioned drawbacks, by providing a method and a small size apparatus for directly contact less precisely measuring a workpiece feeding speed direction and location.

According to an aspect of the present invention, the above objects are achieved by a method for locating a piece with respect to a tool, said method comprising measuring a feeding speed, driving direction and feeding amount of the piece, bearing against abutment rollers, the piece being driven by a driving roller, driven by a controllable motor which is operatively coupled to a numerical control apparatus, and wherein, by measuring means, operatively coupled to the numerical control apparatus, the feeding speed of the piece and the location of the piece with respect to a tool is measured.

The method is carried out by a device for locating a piece with respect to a tool, said device comprising two abutment rollers there against a side of said piece abuts, the opposite side of said piece contacting a driving roller, operatively coupled to a controllable motor, wherein between said two abutment rollers a device for measuring the feeding speed of said piece and the location of said piece with respect to said tool is arranged, and wherein the output of said measuring device and the output of said controllable motor are coupled by a numerical control apparatus.

BRIEF DESCRIPTION OF THE DRAWINGS

The subject matter according to the present invention will be disclosed in a more detailed manner hereinafter with reference to an exemplary embodiment thereof which is schematically shown in the accompanying drawing.

DESCRIPTION OF THE PREFERRED EMBODIMENT

The drawing shows a workpiece 1, comprising, for example, a double-T section member or beam 2, on a side of which two abutment rollers 3 and 4 are arranged.

The piece 1 is controllably driven in the direction of the double arrow (f) by a driving roller 5 bearing against the side of the section member 1 on opposite to the abutment rollers 3 and 4. The driving roller 5 is operatively coupled to a controllable motor 6 which, through a coupling line 7, is in turn operatively coupled to a control numerical apparatus 8 of the machine tool provided for performing drilling, milling, punching or cutting operations on said piece 1.

Between the abutment rollers 3 and 4 a measuring cone element 9, pertaining to a known measuring device 10 is arranged.

Said apparatus 10 comprises a laser beam source providing a set wave length laser beam. Through a mirror system, said laser beam is split into two beams which caused to impinge on the piece 1 with a preset impinging angle, said two laser beams crossing one another and providing an orthogonal grid on the piece surface.

More specifically, said laser beams will be interrupted as the workpiece or material is driven through the measuring are, and such an interruption will be detected by an optical sensor to provide an electric signal the frequency of which will provide an information on the piece speed and displacement distance. Said signal, moreover, will be processed by a signal processor so as to provide two wave shapes in a mutual quadrature relationship and having a frequency directly proportional to the piece speed, the piece speed, position and direction data being advantageously updated in real time to be directly used as feed back data signals for a numerical control device herein replacing a prior encoder.

In this connection it should be pointed out that measurement devices having similar operating features are at present commercially available.

The device 10 is herein mounted on locating lugs 11 and 12 of a supporting plate 13 which, through a hinge assembly 14, can pivot with respect to a locally fixed support element 15.

Thus, owing to this swinging coupling (hinge 14) of the plate 13 supporting the measuring device 10, the cone transmitting a laser beam to the piece 1 being driven and receiving therefrom a return laser beam, can be properly oriented, as schematically shown by the arrow (g), to be so arranged as to be not negatively affected by the return laser beams. Advantageously, the cone element 9 supporting assembly 16 can be removed from the device 10 for cleaning and replacement purposes.

Further advantageously, said supporting assembly 16 comprises an air fitting 17 for supplying pressurized clean air to remove from said cone 9, respectively from the supporting assembly 16 itself, any undesired materials such as powder, chips and refuse materials in general.

The invention claimed is:

1. A device for locating a workpiece with respect to a tool, comprising:
   a pair of abutment rollers abutting against a side of the workpiece,
   a driving roller operatively abutting against an opposite side of the workpiece,
   a drive motor coupled to the driving roller for moving the workpiece at a speed and at positions relative to the tool,
   a measuring device for measuring the speed and position of the workpiece, the measuring device being operative for emitting light between the pair of abutment rollers along an optical path to the workpiece,
   a control apparatus coupled between the drive motor and the measuring device for controlling the drive motor to control movement of the workpiece as a function of the measured speed and position of the workpiece, and
   a pivotable support on which the measuring device is pivotably mounted to orient the optical path along which the light is emitted.

2. The device according to claim 1, wherein the pivotable support includes a fixed plate, and a movable plate on which the measuring device is supported, and wherein the movable plate is hinged to the fixed plate.

3. The device according to claim 2, wherein the pivotable support includes locating lugs between the measuring device and the movable plate.

4. The device according to claim 1, wherein the measuring device includes a removable conical element.

5. The device according to claim 4, and an air fitting on the measuring device for supplying pressurized air to the conical element for cleaning.

6. The device according to claim 1, wherein the tool is a machine tool for removing material from the workpiece.

7. The device according to claim 1, wherein the measuring device includes a mirror assembly for splitting a laser beam having preset wavelength into two beams directed to the workpiece at a preset impinging angle, and wherein the two beams cross and interact and generate a grid orthogonal to a plane that is interrupted as the workpiece is moved.

8. The device according to claim 1, wherein the measuring device is operative for generating an electrical signal having a frequency which provides information on the speed, the position and direction of the workpiece, and wherein the electrical signal is conducted to the control apparatus.

9. A method of locating a workpiece with respect to a tool, comprising the steps of:
   abutting a pair of abutment rollers against a side of the workpiece,
   abutting a driving roller against an opposite side of the workpiece,
   moving the workpiece at a speed and at positions relative to the tool,
   measuring the speed and position of the workpiece by emitting light from a measuring device along an optical path between the pair of abutment rollers to the workpiece,
   controlling movement of the workpiece as a function of the measured speed and position of the workpiece, and
   orienting the optical path along which the light is emitted by pivotably supporting and moving the measuring device.

* * * * *